United States Patent
Burton et al.

(10) Patent No.: US 7,080,133 B1
(45) Date of Patent: Jul. 18, 2006

(54) METHOD AND SYSTEM FOR CONFIGURING A COMPUTER NETWORK

(75) Inventors: Scott Burton, Westminster, CO (US); Richard Curtis Cleavinger, San Diego, CA (US); Nelson W. Gildenmeister, Broomfield, CO (US); John Houkal, Louisville, CO (US); Kevin Kidney, Lafayette, CO (US); John Timothy O'Brien, Louisville, CO (US); Kent D. Prosch, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 893 days.

(21) Appl. No.: 09/617,607

(22) Filed: Jul. 17, 2000

(51) Int. Cl.
G06F 15/177 (2006.01)
G06F 15/16 (2006.01)

(52) U.S. Cl. .................. 709/221; 709/251
(58) Field of Classification Search ........ 709/220–221, 709/248, 251, 208, 211; 370/254, 258; 714/4
See application file for complete search history.

(56) References Cited

U.S. PATENT DOCUMENTS

| | | | | |
|---|---|---|---|---|
| 5,761,417 | A | 6/1998 | Henley et al. ........ | 395/200.09 |
| 5,768,623 | A | 6/1998 | Judd et al. ............. | 395/857 |
| 5,841,989 | A | 11/1998 | James et al. ........... | 395/200.69 |
| 5,901,280 | A | 5/1999 | Mizuno et al. ........ | 395/182.04 |
| 5,931,958 | A * | 8/1999 | Bouvier et al. ......... | 714/48 |
| 5,950,230 | A * | 9/1999 | Islam et al. ........... | 711/156 |
| 6,009,466 | A * | 12/1999 | Axberg et al. .......... | 709/220 |
| 6,058,455 | A * | 5/2000 | Islam et al. ........... | 711/114 |
| 6,282,670 | B1 * | 8/2001 | Rezaul Islam et al. ... | 714/6 |
| 6,345,331 | B1 * | 2/2002 | Fuente .................. | 710/72 |
| 6,349,357 | B1 * | 2/2002 | Chong, Jr. ............. | 711/111 |
| 6,466,540 | B1 * | 10/2002 | Emberty et al. ........ | 370/222 |
| 6,505,272 | B1 * | 1/2003 | Bouvier et al. ........ | 711/111 |
| 6,538,669 | B1 * | 3/2003 | Lagueux et al. ........ | 345/764 |
| 6,601,187 | B1 * | 7/2003 | Sicola et al. .......... | 714/6 |
| 6,618,361 | B1 * | 9/2003 | Park .................... | 370/257 |
| 6,640,278 | B1 * | 10/2003 | Nolan et al. ........... | 711/6 |
| 6,845,387 | B1 * | 1/2005 | Prestas et al. ......... | 709/203 |

(Continued)

FOREIGN PATENT DOCUMENTS

EP 0 580 281 A2 * 4/1994

(Continued)

OTHER PUBLICATIONS

Wilson, A; "SSA: a high-performance serial interface for unparelleled connectivity", Compcon '96, 'Technologies for the Information Superhighway' Digest of Papers , Feb. 25-28, 1996; pp. 274-279.*

(Continued)

Primary Examiner—Bunjob Jaroenchonwanit
Assistant Examiner—Douglas Blair
(74) Attorney, Agent, or Firm—Randall J. Bluestone; Harrington & Smith, LLP

(57) ABSTRACT

A method for configuring a computer network that includes a full duplex bi-directional first port and an initiator that can issue a request for the first port to assume a state. The first port, when in a first state, is able to bi-directionally communicate with a full duplex bi-directional second port, and when in a second state, is coupled to itself by having an output thereof coupled to an input thereof. The method comprises inhibiting the initiator from issuing the request, sending data to the initiator describing a desired state of the first port, and enabling the initiator to issue the request for the first port to assume the desired state.

30 Claims, 5 Drawing Sheets

U.S. PATENT DOCUMENTS 6,922,688 B1 * 7/2005 Frey, Jr. ............ 707/2
6,971,016 B1 * 11/2005 Barnett ............ 713/182
6,983,362 B1 * 1/2006 Kidder et al. ............ 713/1

FOREIGN PATENT DOCUMENTS

WO     WO-99/48252 A1     9/1999

OTHER PUBLICATIONS

Du et al. "Emerging Serial Storage Interfaces: Serial Storage Architecture (SSA) and Fibre Channel—Arbitrated Loop (FC-AL)", Jan. 6, 1997, Distributed Multimedia Resarch Center and Computer Science Department, University of Minnesota.*

"Simultaneous Dual Link transfer from Single Host Single Target using Serial Storage Architecture", IBM Technical Disclosure Bulletin, Aug. 2000, UK, Issue No. 436, p. 1457.*

Shim et al., "Supporting continuous media: is Serial Storage Architecture (SSA) better than SCSI?", Multimedia Computing and Systems '97, Proceddings., IEEE International Con, Jun. 3-6, 1997, pp. 640-641.*

Chang et al., "Interface comparisons: SSA versus FC-AL", Concurrency, IEEE, vol. 6, Issue 2, Apr.-Jun. 1998, pp. 55-70.*

IBM Technical Disclosure Bulletin, Virtual Hot Spare Disk Units, vol. 37, No. 9, Sep. 1994, pp. 5-8.

* cited by examiner

METHOD AND SYSTEM FOR CONFIGURING A COMPUTER NETWORK

FIELD OF THE INVENTION

The present invention relates to computer networks and, more particularly, to a method and system for configuring a computer network that includes devices with configurable full duplex bi-directional ports.

BACKGROUND OF THE INVENTION

A computer network organized as a serial storage architecture (SSA) is a collection of nodes interconnected by a full duplex bi-directional serial connection. A standard for SSA is set forth by the American National Standards Institute (ANSI) Task Group X3T10.1 in documents SSA-S2P, SSA-TL1 and SSA-PH1. Additional references are available from the SSA Industry Association in documents SSA-IA/95PH and SSA-IA95SP.

In SSA, data is transferred between the nodes in data packets using a store and forward technique sometimes referred to as a bucket brigade. When the segments of an SSA network are organized in a loop, each node is coupled to two other nodes and data can travel throughout the network in a full circle. Alternatively, the nodes can be connected in a string, that is, in a line, that terminates without being connected to a subsequent node. However, in either topology, data communication throughout the network proceeds bi-directionally.

Each node has two ports, namely P1 and P2, and each port has an input and an output. Each port is further characterized by a state that can be defined as "on-line", "wrapped" or "off-line". In the on-line state the port is able to bi-directionally communicate with a next port located on an adjacent node. In the wrapped state, the port is coupled to itself by having its output coupled to its input. In the off-line state, the port is not able to communicate with another port, and it is not wrapped.

An SSA network is often referred to as a web. One web can be partitioned into several smaller webs, or separate webs can be combined to form one larger web. Each web will have at least one initiator, which is a processor for routing data and commands to the nodes in the web. In the case where a web includes more than one initiator, the initiators are ranked from a highest priority to a lowest priority. Based on this priority, the initiators will collectively designate one of the initiators as a master initiator.

A master initiator is responsible for handling error conditions that are reported to it by devices on its web. The master initiator is also responsible for setting the state of the ports on its web.

An initiator acquires a view of the topology of the network through a process known as "walking the web." When an initiator walks the web, the initiator examines the ports of the devices in the web of which the initiator is a member, and stores the state of the ports in a topology table. The topology table describes the interconnection between nodes, i.e., the manner in which ports are linked together. It typically includes information such as a node identifier, and the state of each port at the node. Each initiator maintains its own topology table.

Each initiator also maintains its own configuration table. A configuration table includes the same information as a topology table, and further includes initiator registration information and port error handling parameters.

If a device on a web encounters a fault, the device generates an error message, known as an "Async Alert" in SSA parlance. If the Async Alert indicates a port communications problem, the master initiator of the web responds by performing an automatic error recovery process in which it walks the web to examine and possibly request a change of the state of the ports on the web. The master initiator may also issue a message known as a "Master Alert" to the non-master initiators. In response to a Master Alert, a non-master will walk the web and examine the ports on the web. However, a non-master initiator does not request a change of the state of a port.

A master initiator can issue a request for a given port to assume the wrapped state. Provided that the given port is operating normally, the given port will respond by wrapping itself.

Alternatively, a master initiator can issue a request for a given port to assume the on-line state. If the given port can establish communication with an adjacent port, then the given port assumes the on-line state. If the given port cannot establish communication with the adjacent port, then the given port assumes the off-line state. This failure to establish communication can occur when (a) there is no adjacent port, such as when the given port is at the end of a string, (b) the adjacent port is in the wrapped state, or (c) the communication link between the given port and the adjacent port has a problem. Note that the port may automatically transition from the on-line state to the off-line state depending on its ability to establish communication with the adjacent port.

When the network topology changes, initiator mastership can change, and a new master initiator will be responsible for the state of the ports. However, a first initiator cannot read a topology table from a second initiator. Consequently, in a case where the first initiator becomes a master for a web of which the first initiator has no knowledge, the first initiator has no opportunity to preserve the state of a port located in that web.

Note also that the process of walking the web and requesting a particular state for a port is handled exclusively by the initiators. There is no method or means for imposing or even suggesting a desired configuration for the network.

Accordingly, it is an object of the present invention to impose a desired configuration on a computer network notwithstanding the presence of an initiator that can examine and request the ports in the network to assume particular states.

It is another object of the present invention to impose the desired configuration in a case where the network includes multiple webs and multiple initiators.

It is yet another object of the present invention to maintain the desired configuration in a case where the topology of the network changes.

SUMMARY OF THE INVENTION

The present invention is directed toward a method and system for configuring a computer network that includes full duplex bi-directional ports and one or more processors having an ability to examine and request that each port assume a particular state. The processor, also known as an initiator, maintains a copy of a port information map (PIM) that contains data describing a desired state of all the ports in the network.

A control unit imposes a desired configuration by (a) inhibiting all initiators from issuing requests for the ports to change state, (b) sending the PIM describing the desired configuration to the initiators, and (c) enabling the initiators to issue requests for the ports to assume states in accordance with the PIM.

The present invention defines and imposes a desired configuration for the entire computer network and synchronizes the configuration among multiple initiators. When the topology of the network changes, the invention provides for the cases of partitioning the network into smaller networks, and for joining networks together. Because the invention affirmatively defines the state of all ports, when a master initiator walks the web, an isolated node remains isolated.

DETAILED DESCRIPTION OF THE INVENTION

The present invention provides a method for configuring a computer network that includes devices with full duplex bi-directional ports and an initiator having an ability to examine and request each port to assume a particular state in accordance with data describing a desired configuration. Each port can assume an on-line, off-line or wrapped state.

In brief, a control unit constructs a port information map (PIM) that defines a desired state for each port in the entire computer network. The control unit issues the PIM to the initiator. When the initiator configures the web, it requests the ports to assume desired states in accordance with the PIM. In a case of multiple webs and multiple initiators, the PIM provides all initiators with the desired state of all ports in the network. Therefore a given initiator has knowledge of the desired state of all ports, including those that are not in the same web as the given initiator. This allows an initiator to manage the ports in a case where the network topology changes.

Figure 1:
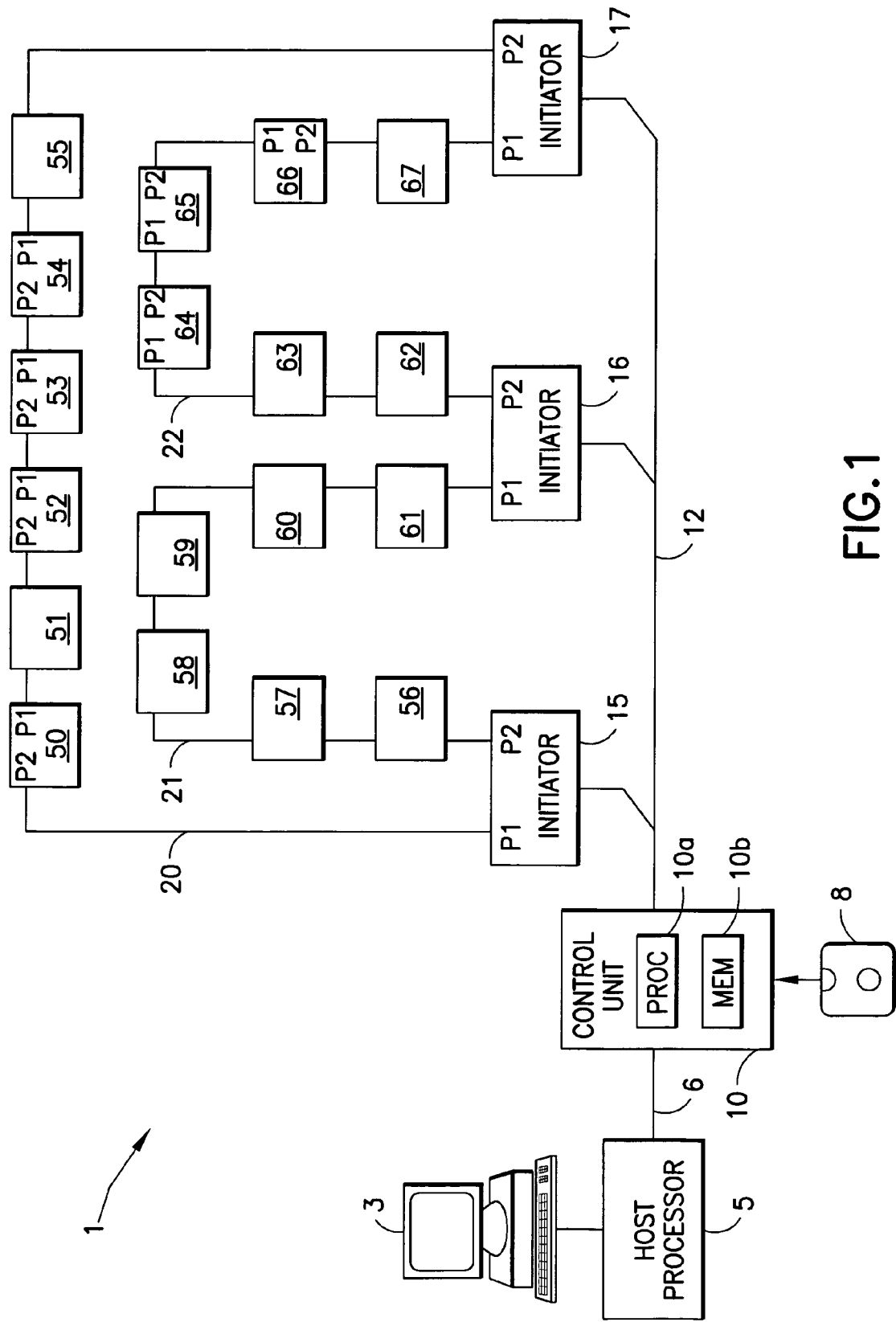
FIG. 1 is a schematic of a computer network organized in a serial storage architecture loop topology.

FIG. 1 is a schematic representation of a computer network 1 organized in a serial storage architecture loop topology. The principal components of the network are a host processor 5 with a user interface 3, a control unit 10, initiators 15–17, and a series of nodes occupied by disk drives 50–67. In a general case, any type of device that can be connected to a computer network, including typical input/output devices can occupy the nodes.

User interface 3 enables a user to send commands and data to, and receive data from, computer network 1. Host processor 5 communicates with control unit 10 over a bus 6, and control unit 10 communicates with initiators 15–17 via a bus 12. Initiators 15–17 and disk drives 50–67 are connected to a network comprising three segments 20, 21 and 22. Each of the initiators 15–17 and disk drives 50–67 include two full duplex bi-directional ports, i.e. P1 and P2, through which data is exchanged. Generally, a device need not be limited to two ports, and the present invention can be applied where the devices have any number of ports.

Host processor 5 executes programs using data that is stored on disk drives 50–67. To access data from a disk drive, disk drive 50 for example, host processor 5 issues a command to control unit 10. Thereafter, control unit 10 issues a corresponding command to initiator 15, which passes the command to disk drive 50. The commands from the initiators 15–17 to the disk drives 50–67 provide for reading data from, and writing data to, disk drives 50–67, and for setting the state of ports on each of disk drives 50–67.

Control unit 10 includes a processor 10*a* and memory 10*b* that can be loaded with a program or data from a storage media, such as data memory 8. When control unit 10 issues a command to any initiator 15–17, the initiator acknowledges the command by returning a status packet indicating whether the initiator successfully completed the command. Although control unit 10 and initiators 15–17 are shown here as separate components, they may be integrated into a single housing, or even a single printed circuit board.

One of the initiators 15–17 must be designated as a master initiator. This designation of mastership occurs during the web walking process. Each of the initiators 15–17 has an identifier that also prioritizes the initiators. When a first initiator walks the web and encounters a second initiator, the first initiator reads the identifier of the second initiator. If the identifier of the first initiator indicates a higher priority, then the first initiator assumes mastership. If the identifier of the second initiator indicates a higher priority, then the first initiator concedes mastership. For the description that follows, assume that the initiators are prioritized as 15, 16 and 17, with initiator 15 having the highest priority.

Computer network 1 can be organized into segments of smaller webs. For example, assume that devices 53 and 65 are isolated from the network. This would yield (a) a first web, configured as a string that included initiators 15 and 16, and devices 50–52 and 56–64, and (b) a second web, configured as a string that included initiator 17, and devices 54, 55, 66 and 67. Initiator 15 would assume mastership of the first web, and initiator 17 would assume mastership of the second web.

A sample Port Information Map is set forth in Table 1, below. Referring again to FIG. 1, assume devices 53 and 65 are isolated. Note that in Table 1, device 53-P1 and -P2 are both indicated as "(undefined)", device 52-P1 is "wrapped", and device 54-P2 is "wrapped". Also, device 65-P1 and -P2 are both indicated as "(undefined)", device 64-P2 is "wrapped", and device 66-P1 is "wrapped".

TABLE 1

PORT INFORMATION MAP
DEVICES 53 AND 65 ISOLATED

| NODE | PORT | STATE |
| --- | --- | --- |
| Initiator 15 | P1 | On-line |
| Initiator 15 | P2 | On-line |
| Initiator 16 | P1 | On-line |
| Initiator 16 | P2 | On-line |
| Initiator 17 | P1 | On-line |
| Initiator 17 | P2 | On-line |
| Device 50 | P1 | On-line |
| Device 50 | P2 | On-line |
| Device 51 | P1 | On-line |
| Device 51 | P2 | On-line |
| Device 52 | P1 | Wrapped |
| Device 52 | P2 | On-line |
| Device 53 | P1 | (undefined) |
| Device 53 | P2 | (undefined) |
| Device 54 | P1 | On-line |
| Device 54 | P2 | Wrapped |
| Device 55 | P1 | On-line |

TABLE 1-continued

PORT INFORMATION MAP
DEVICES 53 AND 65 ISOLATED

| NODE | PORT | STATE |
|---|---|---|
| Device 55 | P2 | On-line |
| Device 56 | P1 | On-line |
| Device 56 | P2 | On-line |
| Device 57 | P1 | On-line |
| Device 57 | P2 | On-line |
| Device 58 | P1 | On-line |
| Device 58 | P2 | On-line |
| Device 59 | P1 | On-line |
| Device 59 | P2 | On-line |
| Device 60 | P1 | On-line |
| Device 60 | P2 | On-line |
| Device 61 | P1 | On-line |
| Device 61 | P2 | On-line |
| Device 62 | P1 | On-line |
| Device 62 | P2 | On-line |
| Device 63 | P1 | On-line |
| Device 63 | P2 | On-line |
| Device 64 | P1 | On-line |
| Device 64 | P2 | Wrapped |
| Device 65 | P1 | (undefined) |
| Device 65 | P2 | (undefined) |
| Device 66 | P1 | Wrapped |
| Device 66 | P2 | On-line |
| Device 67 | P1 | On-line |
| Device 67 | P2 | On-line |

During the new configuration process, control unit 10 issues commands to the initiators 15–17. The commands include a Freeze Command, Query Configuration Command, Execute Port Information Map (XPIM) Command, Unfreeze Command, and Validate Configuration Command.

The Freeze Command inhibits all initiators from responding to an Async Alert by performing an automatic error recovery process. That is, the initiators are inhibited from issuing requests to change the states of the ports when responding to the Async Alert. Note that during regular operation, an initiator may respond to the Async Alert by performing an automatic error recovery process that alters the state of one or more ports.

The Query Configuration Command causes an initiator to send data from its Configuration Table to the control unit. After obtaining a Configuration Table from each of the initiators in the network, the control unit can consider the current actual configuration, and develop a desired configuration, for the entire network.

When issuing the Execute Port Information Map (XPIM) Command, the control unit also sends the PIM to an initiator. The XPIM causes the initiator to walk the web. If the initiator is a master initiator, it is thus enabled to issue requests for the ports in its web to assume states in accordance with the PIM.

The Unfreeze Command enables the initiators to respond to an Async Alert by performing an automatic error recovery process. That is, the initiators are not inhibited from issuing requests to change the states of ports when responding to the Async Alert.

The Validate Configuration Command causes an initiator to walk the web and to compare the actual port settings to data in the PIM. The initiator reports the result of this comparison to the control unit.

Figure 2A:
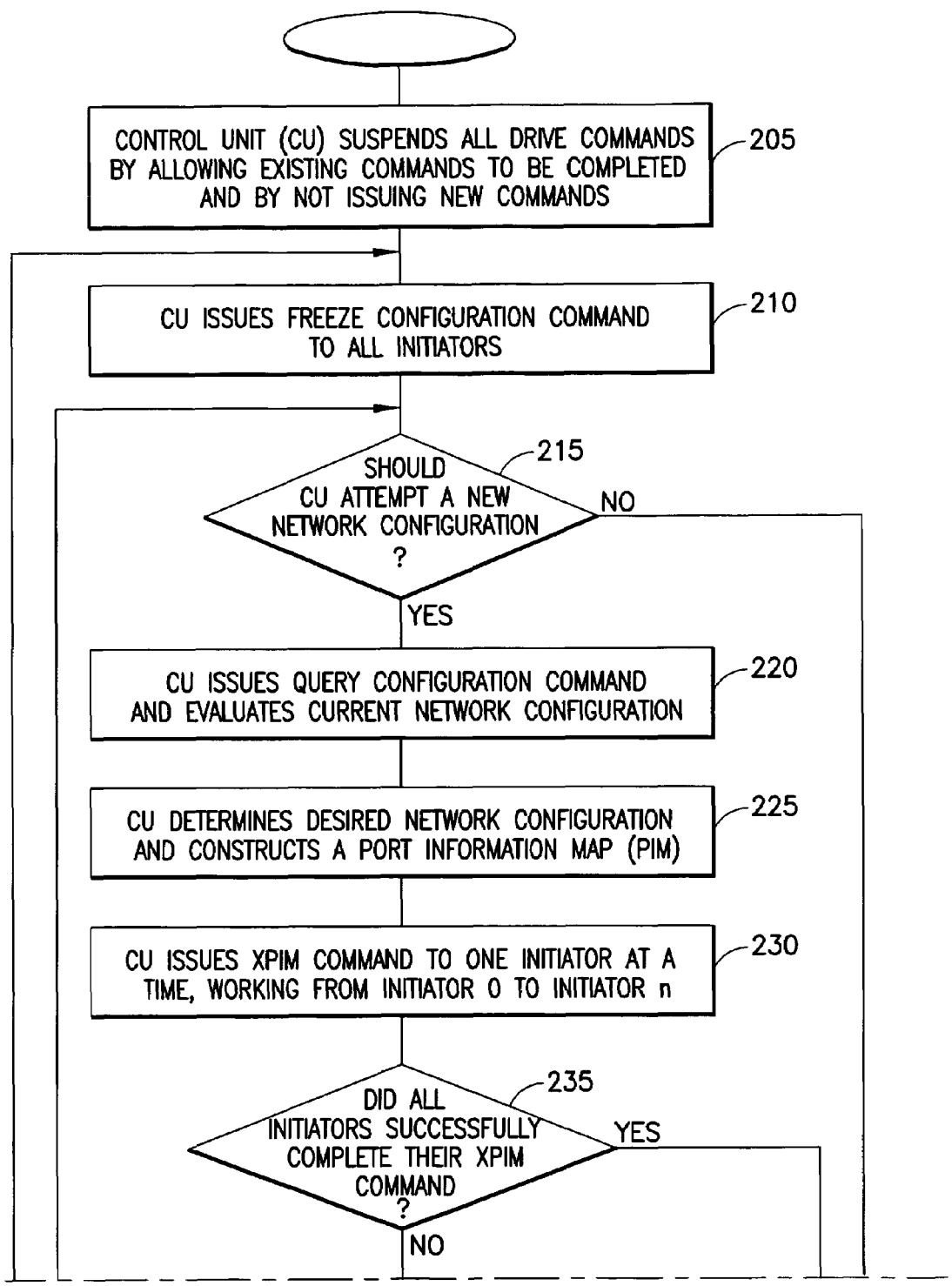
FIG. 2 is a flowchart of a method for imposing a desired configuring on a computer network in accordance with the present invention.
Figure 2B:
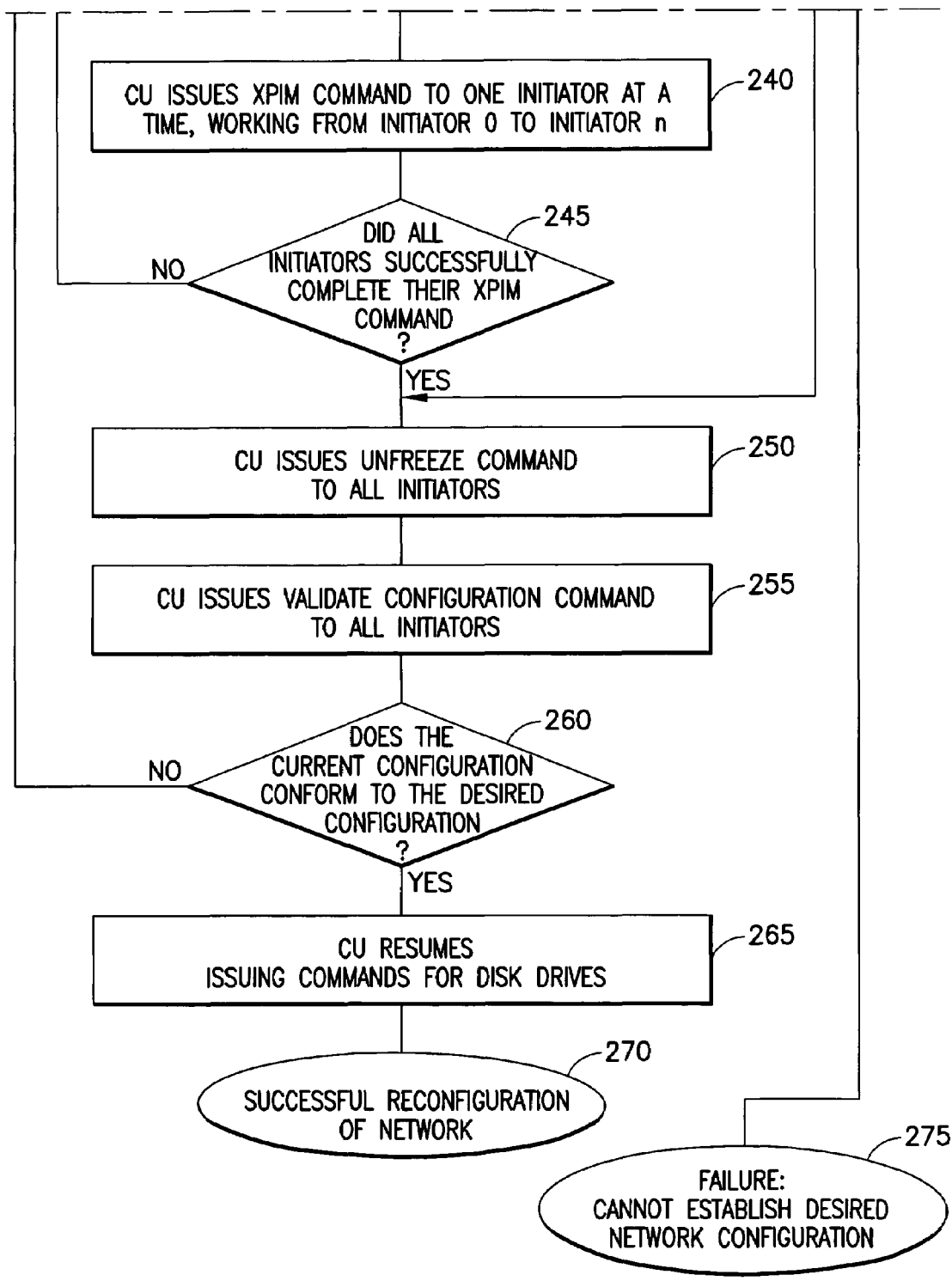

FIG. 2 is a flowchart of a method for imposing a desired configuration on a computer network in accordance with the present invention. This method is applicable to a network having a single initiator, as well as a network having multiple webs and multiple initiators.

In step 205, the control unit (CU) suspends all drive commands by allowing existing drive commands to be completed, and by not issuing new commands. More particularly, the control unit waits for each initiator to acknowledge completion of all commands previously issued by the control unit. The method then advances to step 210.

In step 210, the control unit issues a Freeze Configuration Command to all initiators. All initiators are inhibited from issuing requests to change the states of the ports when responding to an Async Alert. This step ensures that the occurrence of an Async Alert does not interfere with the present process. The method then advances to step 215.

In step 215, the control unit determines whether to attempt to establish a new network configuration. This determination allows for a case where, after a predetermined number of attempts, the control unit has not been able to successfully establish communication with all of the initiators. If the control unit determines that it will not attempt to establish a new network configuration, then the method branches to step 275 and terminates. If the control unit determines that it will attempt to establish a new network configuration, then the method advances to step 220.

In step 220, the control unit issues a Query Configuration Command to each initiator. In response to the Query Configuration Command, an initiator sends data from its Configuration Table to the control unit. The method then advances to step 225.

In step 225, the control unit establishes a desired configuration for the network, based on the actual configuration reported by each of the initiators in step 220. The control unit constructs a Port Information Map (PIM) describing the desired configuration for the entire network. The PIM includes a desired setting for all ports in the network. The method then advances to step 230.

As an alternative to steps 220 and 225, a user of computer network 1 can define a desired configuration via user interface 3. Accordingly, the PIM would be based on input from the user.

Figure 3:
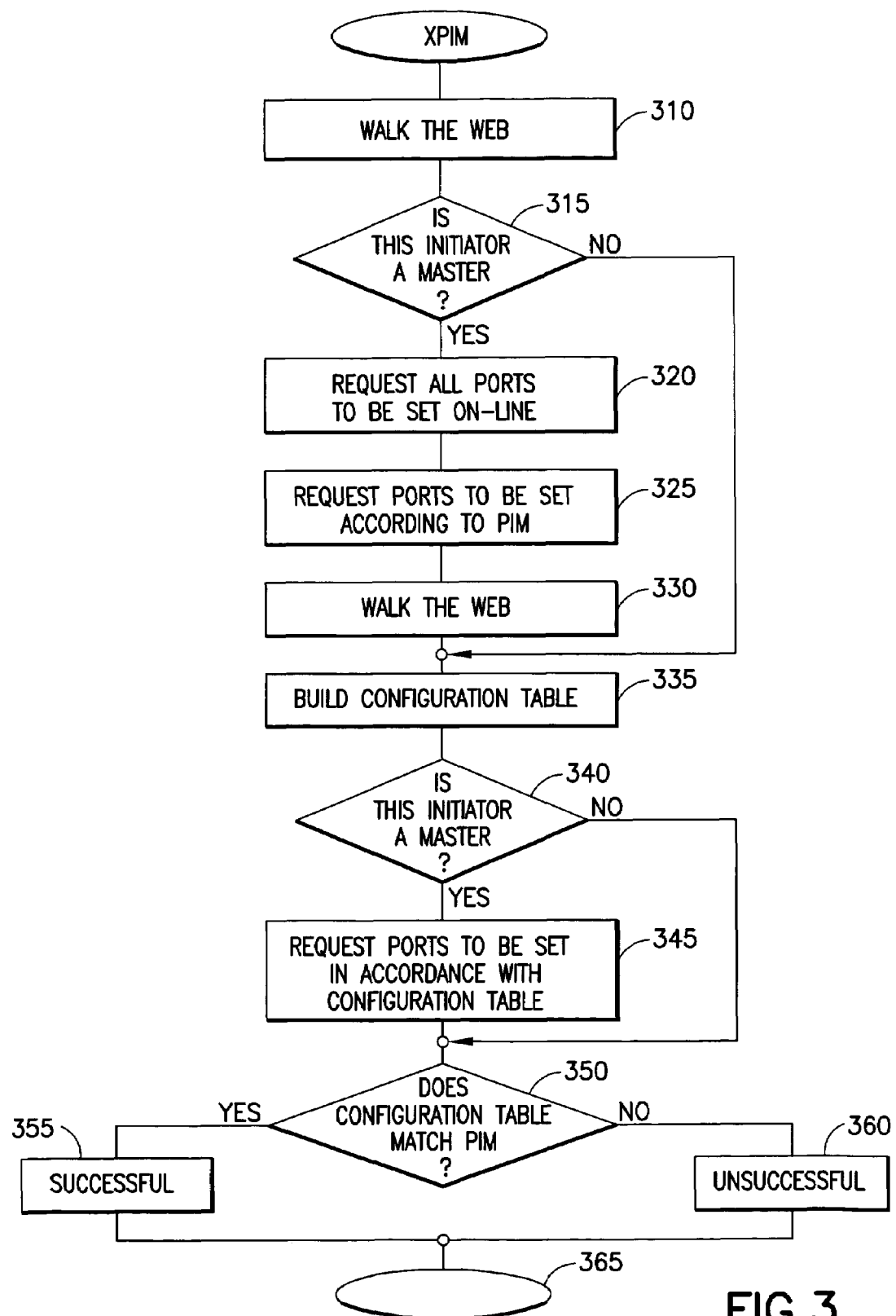
FIG. 3 is a flowchart of a method for an initiator to set the state of a port in a network in accordance with data describing a desired state for the port.

In step 230, the control unit issues an Execute Port Information Map (XPIM) Command to each of the initiators in the network. The control unit sends the command to each initiator in a determined sequence. The sequence starts with the highest-ranking initiator (rank 0) and progresses in order of priority to the lowest-ranking initiator (rank n). With each XPIM Command the control unit also sends the PIM to the initiator describing a desired state of the ports. In response to receiving the XPIM command, the initiator walks the web and constructs a topology table and a configuration table. If the initiator is a master initiator, it may also issue requests for the port states to be set in accordance with the PIM. The XPIM process as executed by an initiator is illustrated in FIG. 3 and described below in greater detail. The method then advances to step 235.

By affirmatively defining a desired state for each port in the network, a network can be partitioned into smaller webs, or similarly, webs can be merged into a larger network. Stated more generally, the method can be applied where a network has M number of webs, each of the M number of webs including a respective initiator and a respective full duplex bi-directional port. After the initiators issue the requests for setting the ports to the desired states, the computer network can have N number of webs, where N is not equal to M.

In step 235, the control unit determines whether all initiators successfully executed the XPIM Commands that were issued in step 230. An initiator acknowledges a command from the control unit by returning a status packet indicating whether the initiator successfully completed the command. If all initiators successfully executed their respective XPIM Command, then the method advances to step 250. If all initiators did not successfully executed their respective XPIM Command, then the method advances to step 240.

In step 240, the control unit issues another XPIM Command to each of the initiators. As before, this is done in sequence starting with the highest-ranking initiator and progressing in order of priority to the lowest-ranking initiator. Each respective initiator executes the process illustrated in FIG. 3. The method then advances to step 245.

In step 245, the control unit determines whether all initiators successfully executed the XPIM Commands that were issued in step 240. If all initiators successfully executed their respective XPIM Command, then the method advances to step 250. If all initiators did not successfully executed their respective XPIM Command, then the method loops back to step 215.

In step 250, the control unit issues an Unfreeze Command to all initiators. The master initiators are thus permitted to request changes in the state of the ports when responding to Async Alerts. The method then advances to step 255.

In step 255, the control unit issues a Validate Configuration Command to each of the initiators. In response, each initiator compares the actual configuration to data in the PIM. The initiators report the result of these comparisons to the control unit. The method then advances to step 260.

In step 260, the control unit determines whether the current configuration of the network conforms to the desired configuration of the network. More particularly, the control unit evaluates the reports sent by the initiators in step 255. If the reports from all initiators indicate that the current configuration matches the PIM, then the method advances to step 265. If the reports from all initiators do not indicate that the current configuration matches the PIM, then the method loops back to step 210.

In step 265, the control unit resumes regular operation by issuing disk drive commands to the initiators. The method then advances to step 270.

In step 270, the method terminates with a successful reconfiguration of the network.

In step 275, the method terminates with a failure. The control unit did not successfully establish the desired network configuration.

FIG. 3 is a flowchart a method executed by an initiator, in response to receiving the Execute Port Information Map (XPIM) command from the control unit. The method begins with step 310.

Figure 4:
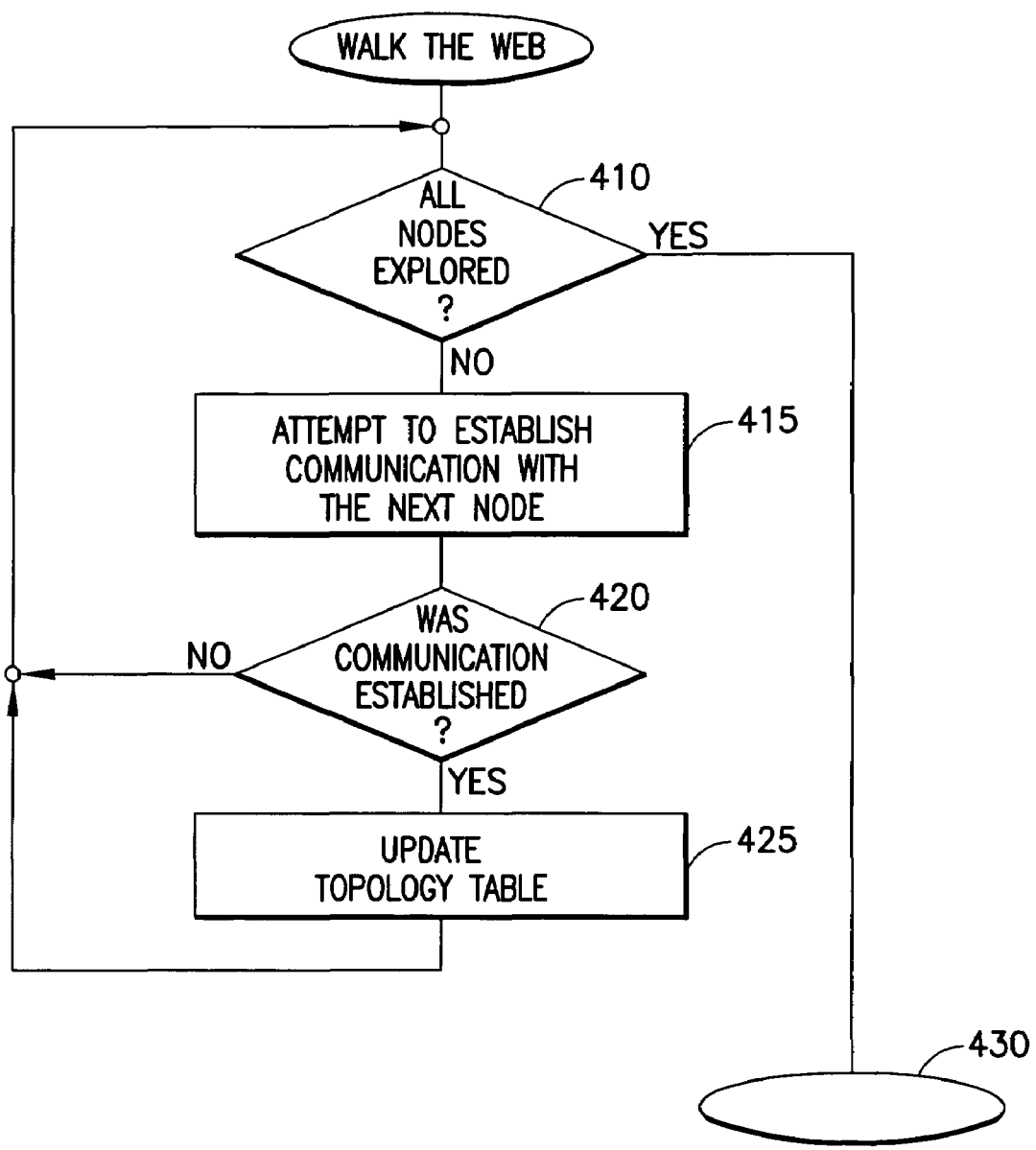
FIG. 4 is a flowchart of a method for an initiator to walk the web and construct a topology table.

In step 310, the initiator walks the web and constructs a topology table. This process is illustrated in FIG. 4, and described below in greater detail. The method then advances to step 315.

In step 315, the method considers whether the initiator is a master initiator. This is accomplished by examining the current topology table that was constructed in step 310. If the initiator is a master, then the method advances to step 320. If the initiator is not a master, then the method branches to step 335.

In step 320, the initiator issues a request for each port in the initiator's web to assume the on-line state. This step ensures that the initiator can communicate with all ports in its web. That is, the initiator can affirmatively access ports that might otherwise be inaccessible because of a previously wrapped port at an intermediate node. The method then advances to step 325.

In step 325, for each port in the initiator's web, the initiator issues a request for the port to assume a desired state in accordance with data in the PIM. The method then advances to step 330.

In step 330, the initiator walks the web and constructs a topology table as shown in FIG. 4. The method then advances to step 335.

In step 335, the initiator constructs a configuration table. The configuration table is first built on the information contained in the topology table. To this topology information, the initiator adds information important to the operation and error handling of the network. This added information includes:

(a) more detailed port setting information derived from the complete web topology;

(b) Async Alert address information used by all the ports and associated master initiator during error handling; and (c) identification and access information used for data access between initiators and drives.

The method then advances to step 340.

In step 340, the method considers whether the initiator is a master initiator. This is accomplished by examining the most current topology table constructed in steps 310 or 330. Note that a previous master initiator may have lost web mastership as a result of steps 320 and 325. If the initiator is a master, then the method advances to step 345. If the initiator is not a master, then the method branches to step 350.

In step 345, for each port in the initiator's web the initiator issues a request for the port to assume a final state in accordance with the configuration table. The port's final state includes not only a setting in accordance with data in the PIM, but also settings important to the operation and error handling of the network. The method then advances to step 350.

In step 350, the initiator compares the actual configuration of the web, as represented in the initiator's configuration table, to the PIM. If the configurations match, then the method advances to step 355. If the configurations do not match, then the method advances to step 360.

In step 355, the XPIM is declared as a success. The method then advances to step 365.

In step 360, the XPIM is declared unsuccessful. The method then advances to step 365.

In step 365, the XPIM method ends.

FIG. 4 is a flowchart of a method for an initiator to walk the web and construct a topology table. Initially, the topology table is empty. The method begins with step 410.

In step 410, the method considers whether the initiator has explored all nodes in the web in which the initiator is located. All nodes are explored when (a) the initiator encounters a given node for a second time, thus indicating that the initiator has explored an entire a loop, or (b) the initiator has explored all nodes that are accessible via all of the initiators' ports. If the initiator has explored all nodes, then the method branches to step 430. If the initiator has not yet explored all nodes, then the method advances to step 415.

In step 415, the initiator attempts to establish communication with a next node. The method then advances to step 420.

In step 420, the method determines whether the attempt to establish communication in step 415 was successful. For example, if the initiator has progressed to the end of a string, then there is no next node and the attempted communication will not be successful. If the attempt to establish communication was not successful, then the method loops back to step 410. If the attempt to establish communication was successful, then the method advances to step 425.

In step 425, the initiator updates its topology table. That is, the initiator adds an entry to the topology table to represent the node. The method then loops back to step 410.

In step 430, the method for walking the web ends.

The present invention for configuring a computer network can also be applied in the following circumstances: configuring an SSA web during a power-on sequence, configuring an SSA web during drive replacement or initiator replacement, configuring an SSA web during drive capacity upgrades, fencing a drive, and fencing an SSA initiator. However, the present invention is not limited to SSA, but can be used for any computer network having devices with full duplex bi-directional ports that can be set to an on-line or wrapped state.

It should be understood that the foregoing description is only illustrative of the invention. Various alternatives and modifications can be devised by those skilled in the art without departing from the invention. Further, while the procedures required to execute the invention hereof are indicated as already loaded into the memory of the control unit and initiators, they may be configured on a storage media, such as data memory 8 in FIG. 1, for subsequent loading into the control unit and initiators. Accordingly, the present invention is intended to embrace all such alternatives, modifications and variances that fall within the scope of the appended claims.

What is claimed is:

1. A method performed by a controller coupled to a computer storage network for configuring the computer storage network, the computer storage network comprising a plurality of devices coupled together through full duplex bi-directional ports, each of said devices comprising at least two of the ports, each of said ports having at least two states, said network further comprising an initiator coupled to said plurality of devices, wherein said initiator can issue a request for any one of said ports in said plurality of devices to assume any one of said at least two states,
   wherein each of said ports, when in a first of said at least two states and as part of one of said plurality of devices, is able to bi-directionally communicate with another of said ports in another of the plurality of devices,
   wherein each of said ports, when in a second of said at least two states and as part of one of said plurality of devices, is coupled to itself by having an output thereof coupled to an input thereof,
   said method comprising:
   inhibiting said initiator from issuing any requests for any of said ports of said plurality of devices to assume one of said at least two states,
   sending data to said initiator, said data including a port information map describing a desired state for each of the ports in said plurality of devices, and
   enabling, after inhibiting and sending, said initiator to issue requests for said selected ports in said plurality of devices to assume corresponding desired states described by said data, wherein each of said desired states corresponds to one of the at least two states.

2. The method of claim 1, further comprising after inhibiting, receiving data from said initiator describing an actual state of a given port of said selected ports.

3. The method of claim 2, further comprising after receiving, determining said desired state of said given port based on said actual state of said given port.

4. The method of claim 1, wherein said plurality of devices comprises a web, said computer network includes a plurality of webs, and each of said plurality of webs includes a respective initiator and a respective plurality of devices, each respective initiator coupled to ports for its respective subset of devices.

5. The method of claim 1, wherein said plurality of devices comprises a web, prior to inhibiting said computer network has M number of webs, and each of said M number of webs includes a respective initiator and a respective plurality of devices, each respective initiator coupled to ports for its respective subset of devices, and after enabling said computer network has N number of webs, wherein each of said N number of webs includes a respective initiator and a respective plurality of devices, each respective initiator coupled to ports for its respective subset of devices, where N is not equal to M.

6. The method of claim 1, wherein said initiator is one of a plurality of initiators coupled to the plurality of devices, and wherein inhibiting comprises inhibiting said plurality of initiators from issuing any requests for any of said ports of said plurality of devices to assume one of the at least two states, and wherein enabling comprises enabling said plurality of initiators in a determined sequence.

7. The method of claim 1, wherein said desired state is specified by a user.

8. The method of claim 1, wherein said computer network conforms to American National Standards Institute (ANSI) Standard X3T10.1.

9. A controller coupled to a computer storage network for configuring the computer storage network, the computer storage network comprising a plurality of devices coupled together through full duplex bi-directional first ports, each of said devices comprising at least two of the ports, said network further comprising an initiator coupled to said plurality of devices, wherein said initiator can issue a request for any one of said ports in said plurality of devices to assume any one of said at least two states,
   wherein each of said ports, when in a first of said at least two states and as part of one of said plurality of devices, is able to bi-directionally communicate with another of said ports in another of the plurality of devices,
   wherein each of said ports, when in a second of said at least two states and as part of one of said plurality of devices, is coupled to itself by having an output thereof coupled to an input thereof,
   said controller comprising:
   means for inhibiting said initiator from issuing any requests for any of said ports of said plurality of devices to assume one of the at least two states,
   means for sending data to said initiator, the data include a port information map describing a desired state for each of the ports in said plurality of devices, and
   means for enabling said initiator to issue, after the inhibit and send operations, requests for said selected ports in said plurality of devices to assume corresponding desired states described by said data, wherein each of said desired states corresponds to one of the at least two states.

10. The controller of claim 9, further comprising means for receiving data from said initiator describing an actual state of a given port of said selected ports.

11. The controller of claim 10, further comprising means for determining said desired state of the given port based on said actual state of the given port.

12. The controller of claim 9, wherein said plurality of devices comprises a web, said computer network includes a plurality of webs, and each of said plurality of webs includes a respective initiator and a respective plurality of devices, each respective initiator coupled to ports for its respective subset of devices.

13. The controller of claim 9, wherein said plurality of devices comprises a web, said computer network has M number of webs, and each of said M number of webs includes a respective initiator and a respective plurality of devices, each respective initiator coupled to ports for its respective subset of devices, and said controller configures said computer network to yield N number of webs, wherein each of said N number of webs includes a respective initiator and a respective plurality of devices, each respective initiator coupled to ports for its respective subset of devices, where N is not equal to M.

14. The controller of claim 9, wherein said initiator is one of a plurality of initiators coupled to the plurality of devices, and wherein said inhibiting means inhibits said plurality of initiators from issuing any requests for any of said ports of said plurality of devices to assume one of the at least two states, and wherein said enabling means enables said plurality of initiators in a determined sequence.

15. A storage media including instructions for controlling a processor coupled to a computer storage network, the processor that, in turn, configures the computer storage network, the computer storage network comprising a plurality of devices coupled together through full duplex bi-directional ports, each of said devices comprising at least two of the ports, each of said ports having at least two states, said network further comprising an initiator coupled to said plurality of devices, wherein said initiator can issue a request for any one of said ports in said plurality of devices to assume any one of said at least two states, wherein each of said ports, when in a first of said at least two states and as part of one of said plurality of devices, is able to bi-directionally communicate with another of said ports in another of the plurality of devices, wherein each of said ports, when in a second of said at least two states and as part of one of said plurality of devices, is coupled to itself by having an output thereof coupled to an input thereof, said storage media comprising:

means for controlling said processor to inhibit said initiator from issuing any requests for any of said ports of said plurality of devices to assume one of said at least two states, means for controlling said processor to send data to said initiator, the data including a port information map describing a desired state for each of the ports in said plurality of devices, and means for controlling said processor to enable, after the inhibit and send operations, said initiator to issue requests for said selected ports in said plurality of devices to assume corresponding desired states described by said data, wherein each of said desired states corresponds to one of the at least two states.

16. The storage media of claim 15, further comprising means for controlling said processor to receive data from said initiator describing an actual state of a given port of said selected ports.

17. The storage media of claim 16, further comprising means for controlling said processor to determine said desired state of said given port based on said actual state of said given port.

18. The storage media of claim 15, wherein said plurality of devices comprises a web, said computer network includes a plurality of webs, and each of said plurality of webs includes a respective initiator and a respective plurality of devices, each respective initiator coupled to ports for its respective subset of devices.

19. The storage media of claim 15, wherein said plurality of devices comprises a web, said computer network has M number of webs, and each of said M number of webs includes a respective initiator and a respective plurality of devices, each respective initiator coupled to ports for its respective subset of devices, and said processor configures said computer network to yield N number of webs, wherein each of said N number of webs includes a respective initiator and a respective plurality of devices, each respective initiator coupled to ports for its respective subset of devices, where N is not equal to M.

20. The storage media of claim 15, wherein said initiator is one of a plurality of initiators coupled to the plurality of devices, and wherein said storage media comprises means for controlling said processor to inhibit said plurality of initiators from issuing any requests for any of said ports of said plurality of devices to assume one of the at least two states, and means for controlling said processor to enable said plurality of initiators in a determined sequence.

21. In a storage network that comprises at least one web, each of the at least one webs comprising at least one initiator and a plurality of storage devices coupled together through full duplex bi-directional ports, each of the storage devices comprising at least two of the ports, each of the ports having at least two states, each initiator able to issue requests for ports in storage devices in the web to which the initiator belongs to assume any one of the at least two states, wherein each of the ports when in one of the storage devices and in a first of the at least two states is able to bi-directionally communicate with another of the ports in another of the plurality of storage devices, wherein each of the ports when in a second of the at least two states is coupled to itself by having an output thereof coupled to an input thereof, a method performed on a controller in the storage network, comprising:

preventing a given initiator in a given web from responding to error messages from storage devices in the given web;

sending a map to the given initiator, the map describing a desired state for each of the ports of storage devices in the given web, wherein each of the desired states corresponds to one of the at least two states;

commanding, after preventing and sending, the given initiator to issue requests for the ports of the storage devices in the given web to assume corresponding desired states described by the map; and allowing, after commanding, the given initiator to respond to error messages from storage devices in the given web.

22. The method of claim 21, wherein the given initiator would respond to an error message by issuing a request for a port of the storage device issuing the error message to assume a given one of the at least two states.

23. The method of claim 21, wherein:

the at least one web comprises a plurality of webs;

preventing further comprises preventing each of the initiators in the network from responding to error messages from storage devices in a corresponding web;

sending further comprises sending maps to each of the initiators in the network, each of the maps describing a desired state for each of the ports of the storage devices in a corresponding one of the webs, wherein each of the desired states corresponds to one of the at least two states;

commanding further comprising commanding each of the initiators in the network to issue requests for the ports of the storage devices in a corresponding web to assume corresponding desired states described by a corresponding map; and allowing further comprises allowing each of the initiators in the network to respond to error messages from storage devices in a corresponding web.

24. The method of claim 21, wherein:

the at least one web comprises a plurality of webs;

preventing further comprises preventing each of the initiators in the network from responding to error messages from storage devices in a corresponding web;

sending further comprises sending a map to each of the initiators in the network, the map describing a desired state for each of the ports of the storage devices in the network, wherein each of the desired states corresponds to one of the at least two states;

commanding further comprises commanding each of the initiators in the network to issue requests for the ports of the storage devices in a corresponding web to assume corresponding desired states described by the map; and allowing further comprises allowing each of the initiators in the network to respond to error messages from storage devices in a corresponding web.

25. The method of claim 24, wherein each of the initiators is assigned an order commanding further comprises individually commanding each of the initiators in the network to issue requests for the ports of the storage devices in a corresponding web to assume corresponding desired states described by the map, wherein individual commands to each of the initiators are issued to each of the initiators in a sequence defined by the order.

26. The method of claim 21, further comprising commanding the given initiator to determine actual states of the ports of the storage devices in the given web.

27. The method of claim 26, further comprising:

determining if the actual states of the ports in the storage devices in the given web match the desired states of the ports in the storage devices in the given web; and in response to a determination that the actual states and desired states of the ports in the storage devices in the given web do not match, repeating the operations of preventing, sending, commanding the given initiator to issue requests, and allowing.

28. The method of claim 21, wherein the initiators able to issue requests for ports in storage devices in the web to which the initiators belongs to assume any one of the at least two states are master initiators, and the network comprises at least one additional initiator that is not able to issue requests for ports in storage devices in the web to which the at least one additional initiator belongs to assume any one of the at least two states.

29. The method of claim 21, wherein the map describes a desired state for each of the ports of storage devices in the given web and a desired state for each of at least one port in a storage device not in the given web but to which the given initiator is coupled.

30. A controller in a storage network, the storage network comprising at least one web, each of the at least one webs comprising at least one initiator and a plurality of storage devices coupled together through full duplex bi-directional ports, each of the storage devices comprising at least two of the ports, each of the ports having at least two states, each initiator able to issue requests for ports in storage devices in the web to which the initiator belongs to assume any one of the at least two states, wherein each of the ports when in one of the storage devices and in a first of the at least two states is able to bi-directionally communicate with another of the ports in another of the plurality of storage devices, wherein each of the ports when in a second of the at least two states is coupled to itself by having an output thereof coupled to an input thereof, wherein the controller is configured to prevent a given initiator in a given web from responding to error messages from storage devices in the given web, configured to send a map to the given initiator, the map describing a desired state for each of the ports of storage devices in the given web, wherein each of the desired states corresponds to one of the at least two states, the controller further configured to command, after the prevent and send operations, the given initiator to issue requests for the ports of the storage devices in the given web to assume corresponding desired states described by the map, and the controller additionally configured to allow, after the command operation, the given initiator to respond to error messages from storage devices in the given web.

* * * * *